(12) United States Patent  (10) Patent No.: US 8,494,205 B2
Jensen  (45) Date of Patent: Jul. 23, 2013

(54) BASE STATION, WIRELESS HEADSET AND HEADBAND THERETO

(75) Inventor: Lars T. Jensen, Solrød Strand (DK)

(73) Assignee: Sennheiser Communications A/S, Solrød Strand (DK)

( * ) Notice: Subject to any disclaimer, the term of this patent is extended or adjusted under 35 U.S.C. 154(b) by 172 days.

(21) Appl. No.: 12/923,799

(22) Filed: Oct. 7, 2010

(65) Prior Publication Data

US 2011/0086677 A1   Apr. 14, 2011

Related U.S. Application Data

(60) Provisional application No. 61/249,620, filed on Oct. 8, 2009.

(30) Foreign Application Priority Data

Oct. 8, 2009   (EP) .................................... 09172547

(51) Int. Cl.
*H04R 25/00*   (2006.01)

(52) U.S. Cl.
USPC ........ 381/370; 381/384; 455/573; 455/575.2; 455/569.1; 455/575.1; 379/430; 320/107; 320/114; 320/115

(58) Field of Classification Search
None
See application file for complete search history.

(56) References Cited

U.S. PATENT DOCUMENTS

| 6,055,312 | A | * | 4/2000 | Pralus et al. | 379/430 |
|---|---|---|---|---|---|
| 6,130,953 | A | | 10/2000 | Wilton et al. | |
| 7,409,234 | B2 | * | 8/2008 | Glezerman | 455/569.1 |
| 7,519,196 | B2 | * | 4/2009 | Bech | 381/371 |
| 7,609,026 | B2 | | 10/2009 | Tsunoda | |
| 7,613,315 | B2 | | 11/2009 | Vaerum et al. | |
| 7,639,832 | B2 | | 12/2009 | Mann et al. | |
| 2005/0212479 | A1 | | 9/2005 | Tsunoda | |
| 2006/0198543 | A1 | | 9/2006 | Vaerum et al. | |
| 2009/0322278 | A1 | * | 12/2009 | Franks et al. | 320/107 |
| 2010/0137038 | A1 | * | 6/2010 | Scholz et al. | 455/573 |

FOREIGN PATENT DOCUMENTS

WO   2006076916   7/2006

* cited by examiner

*Primary Examiner* — Duc Nguyen
*Assistant Examiner* — Taunya McCarty
(74) *Attorney, Agent, or Firm* — Dykema Gossett PLLC

(57) ABSTRACT

A base station, wireless headset and headband, the headset being powered by a rechargeable battery, the base station having a cradle with charging output points, and the headset having a cradle-neck with charging input contact points. The headset may be cradled in a charging position to ensure electrical connection between the base station and the rechargeable battery through the electrical contact points. The wireless headset includes attachment sites for releasable attachment thereto of the headband to form a headband-headset assembly.

12 Claims, 18 Drawing Sheets

BASE STATION, WIRELESS HEADSET AND HEADBAND THERETO

CROSS-REFERENCE TO RELATED APPLICATION

This application is based on U.S. Provisional Application No. 61/249,620, filed Oct. 8, 2009, the priority of which is hereby claimed.

TECHNICAL FIELD

The present invention relates to a base station, wireless headset and headband thereto where the headset is powered by a rechargeable battery therein. The base station has a cradle with charging output contact points and the headset has a cradle-neck with charging input contact points and the wireless headset further includes attachment sites corresponding to holding elements on the headband.

BACKGROUND ART

Wireless headsets which may be worn alone on one ear or may be seated in and worn with a headband are known, and also it is known to provide a rechargeable battery with the headset. In such prior art systems a base station is customary, and the headset may be seated or cradled herein to gain contact with charging points to establish a charging voltage on the rechargeable battery. In such prior art systems, the cradling of the headset is often prohibited when the headset is mounted in the headband, or possibly the headband is sticking out of the base station at an odd angle and constitutes a nuisance to the user at the desk where such a system is usually parked.

A wireless headset with a rechargeable battery and base station thereto where the headset may be used with or without a headband and where recharging of the rechargeable battery is facilitated both with the headset alone, and through the headband when the headset is mounted in the headset is thus desired. When the headset battery is charged through a connection running in the headband further design options becomes available, such as the provision of a large and exchangeable ear muff, and charging with the headband pointing out of the base station at the same angle irrespective of the positioning of a microphone boom arm.

DISCLOSURE OF INVENTION

An object of the invention is achieved by a base station, wireless headset and headband thereto where the headset is powered by a rechargeable battery comprised therein and where the base station has a cradle with charging output contact points and the headset has a cradle-neck with charging input contact points. The wireless headset further comprises attachment cites corresponding to holding elements on the headband, wherein the headband comprises: —a headband cradle portion with charging output points corresponding to the charging input points of the headset, —a headband cradle-neck with charging input points, corresponding to the base station charging output points. The charging input points at the cradle neck portion of the headband and the charging output points at the cradle portion of the headband are connected through electric leads.

With the invention a system comprising a base station, a headset and a headband is provided, wherein the greatest possible flexibility may be built into the system, such that the charging connection points at the base station are connectable to corresponding charging points at either the headset alone or at the headband part. By having charging points at both headband and the headset the headband which has a long bow part designed to reach across the head of a user will always come out of the base station in the same angle and can be arranged not to be in the way of other appliances residing on the desk or other working space of the user. Further, the cradle neck arrangement at the headband and the headset allows the user to remove the headset or the headband with headset with one hand, and cradle the device without changing the grip on the device or provide support with the other hand. The magnetic coupling at the cradle thus along with the other features of the cradle and cradle neck connections aids in facilitating the smooth operation of the device with one hand.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

DETAILED DESCRIPTION OF THE PREFERRED EMBODIMENT

In most of the figures a small vignette is provided displaying the x,y and z axis of the digital model of the embodiment of the invention from which the figures are derived, in order to facilitate easier reading of the figures.

Figure 1:
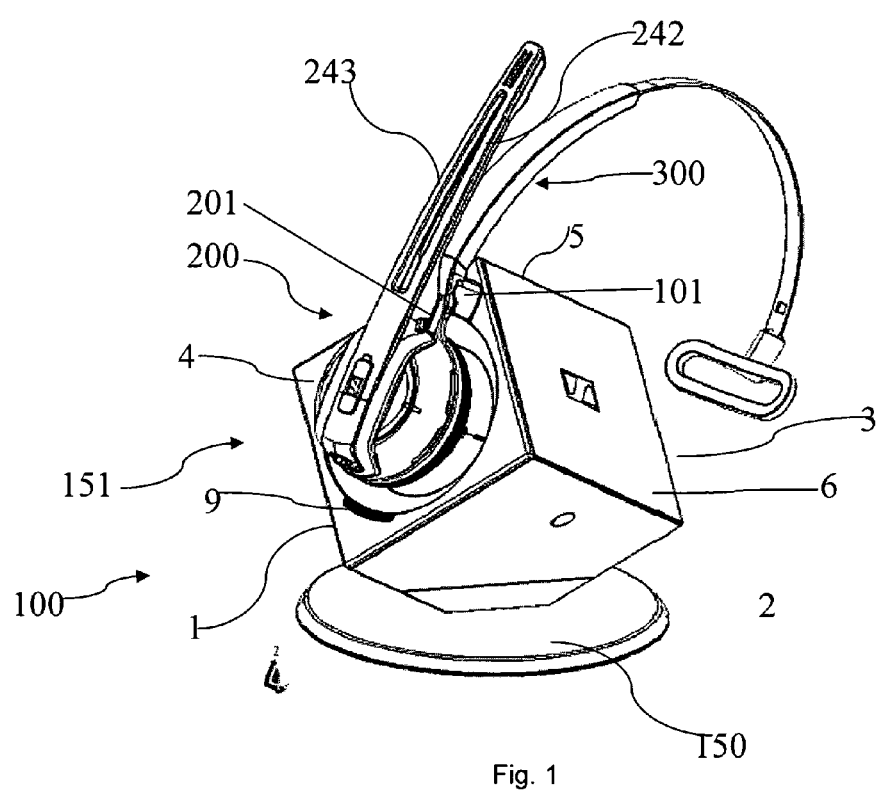
FIG. 1 shows the headset/headband combination cradled in the base station.
Figure 2:
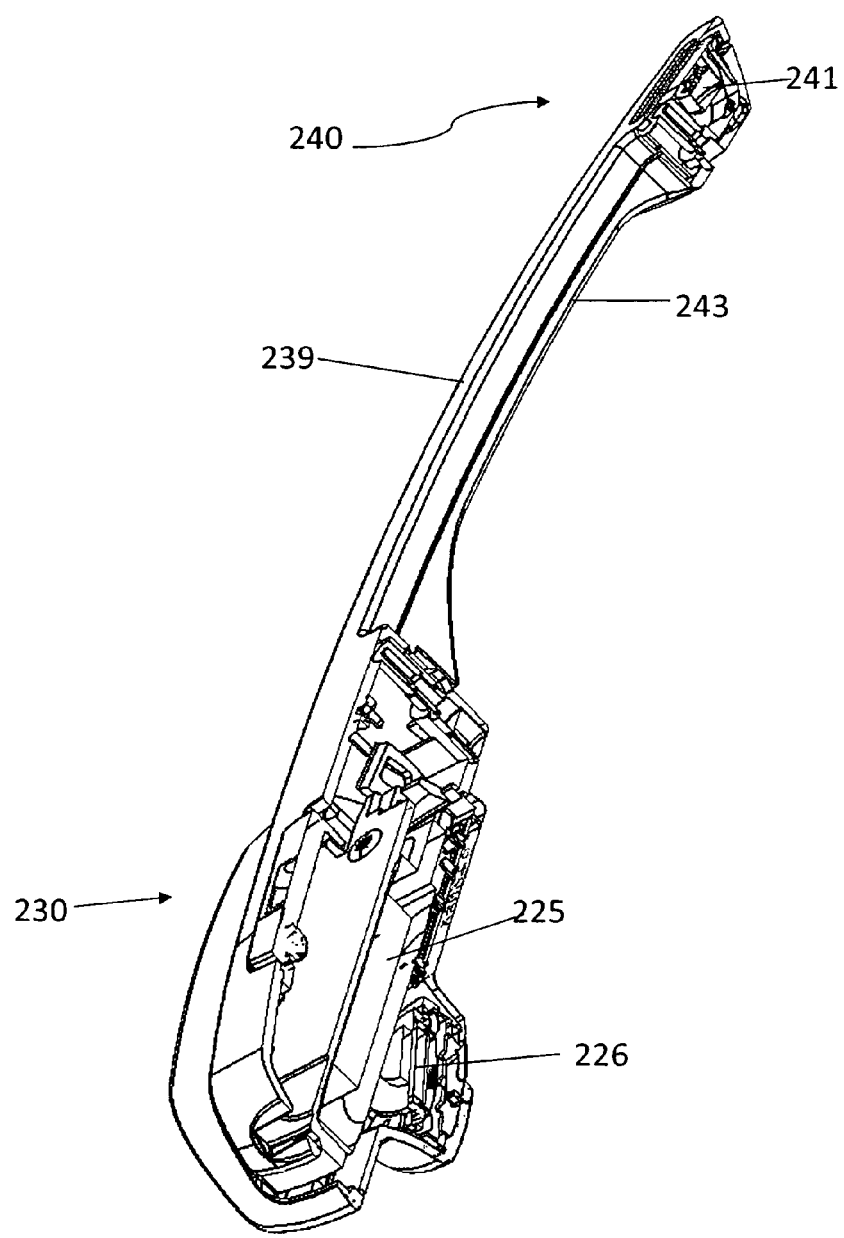
FIG. 2 shows a section view of the headset in a 3d projection.
Figure 3:
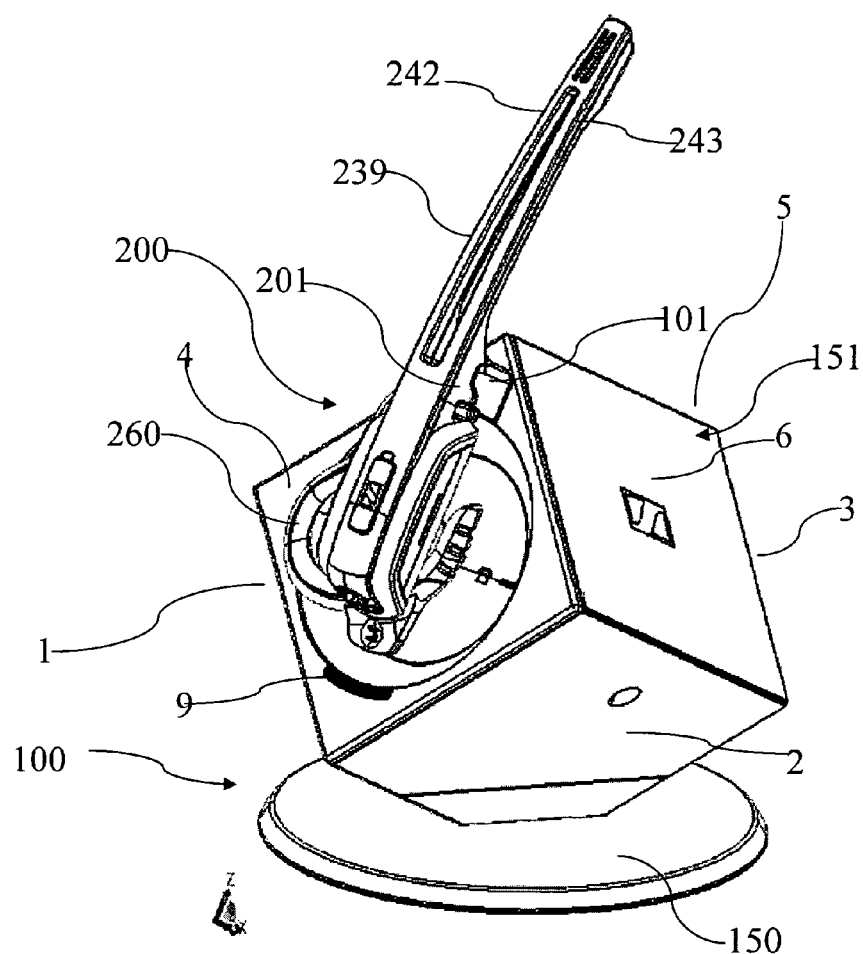
FIG. 3 shows the headset with an ear hook cradled in the base station.

In FIG. 1 the base station 100, the wireless headset 200 and the headband 300 are shown with the headset 200 and the headband 300 fastened to each other and placed in the base station 100. The headset 200 is powered by a rechargeable battery 225 which is enclosed inside casing parts thereof. In FIG. 2 a sectional view of the headset is shown, and here also the loudspeaker 226 is disclosed at an electronics and housing part 230 of the headset. Distanced from the electronics and housing part 230, a distal part 240 is provided at the end of a boom arm 239. Inside the distal part 240 a microphone unit is located, comprising one or more microphones 241. The base station 100 has a cradle 101 and the headset 200 has a corresponding cradle-neck 201. As seen in FIG. 3 the headset 200 may be seated in the cradle 101 of the base station by way of the cradle-neck 201 being shaped to fit into the cradle 101. The cradle 101 mounts charging output points 111, 112 and the cradle-neck 201 of the headset 200 mounts charging input contact points 211, 212 and these charging in input points 211, 212 are connected to the rechargeable battery 225 of the headset. The headset 200 may be cradled in a charging position as shown in FIG. 3 to ensure electrical connection between the base station 100 and the rechargeable battery 225 through the electrical contact points defined as output points 111, 112 of the base station and the input points 211, 212 of the headset, respectively.

The wireless headset 200 has first attachment sites comprising aperature 203 at the cradle-neck 201 and further attachment sites 202 at the electronics and housing part 230 for releasably attachment thereto of the headband 300 to form a headband-headset assembly.

The headband 300 comprises a cradle portion 301 mounting charging output points 311,312 providing a releasable mechanical attachment point between this headband cradle portion 301 and the headset cradle-neck portion 201 and simultaneous electrical connection between the headband charging output points 311,312 and the cradle-neck input charging points 211,212 of the headset 200.

The headband 300 also comprises a headband cradle-neck 320 (se FIG. 8) mounting charging input points 321,322 providing a releasable mechanical attachment point between this headband cradle neck 320 and the base station cradle 101 and simultaneous electrical connection between the headband charging input points 321,322 and the base station charging output points 111,112.

The charging input points 321,322 at the cradle-neck portion 320 of the headband 300 and the charging output points 311,312 at the cradle portion 301 of the headband 300 are connected through electrical leads 330, such that the headset battery 225 is chargeable through the headband 300 when seated in the headband 300 and the headband 300 is mounted in the base station cradle 101.

The advantage of the above described arrangement is that the headset battery 225 may be charged from the base station 100 when used alone as well as when used with the headband 300. In this way the user need not separate the headband and headset from each other in order to facilitate charging of the rechargeable battery. It is also noted that by providing the headband with a cradle neck portion of its own with charging points, and fitting the cradle of the base station, a very secure and mechanically reliable fixation of the assembled headset and headband in the base station may be provided, such that the added weight of the headband will not compromise the establishment of a secure electrical connection between the charging points of the base station 100 and the rechargeable battery 225 in the headset 200.

Figure 4:
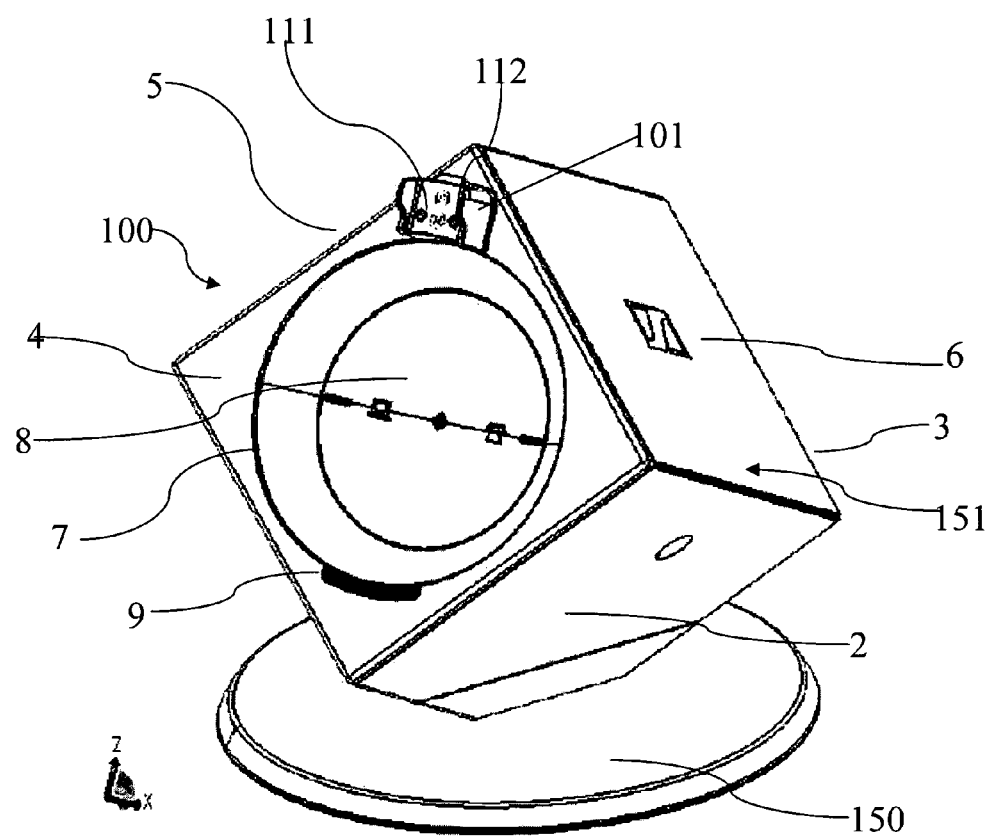
FIG. 4 shows the base station with the cradle portion.

The headband cradle-neck portion 320 and the headband cradle portion 301 are mutually rotatable with respect to each other, allowing a boom arm 239 of the headset 200 to be rotated to a position wherein it points towards the user's mouth when the headband 300 with the headset 200 is mounted on the head of a user. This is illustrated in FIG. 4b.

This adjustment possibility allows the user to personalize the headband and headset for the shape and proportions of his or her head, and it ensures that the microphone unit 240 may always be positioned close to the user's mouth.

The electrical leads 330 between the charging input points 321,322 at the cradle neck portion 320 of the headband 300 and the charging output points 311,312 at the cradle portion 301 of the headband 300 allow the mutual rotational positioning between the headband cradle neck portion 320 and the headband cradle portion 301 without disturbance to the electrical connection. In this manner the charging of the rechargeable battery 225 may take place when the headset, seated in the headband, is turned to any position with respect to the cradle neck portion 320. This is an important advantage to the user who regardless of the turning point of the boom arm may cradle the headband with headset in the base station and be sure of a good charging connection being established.

Figure 10:
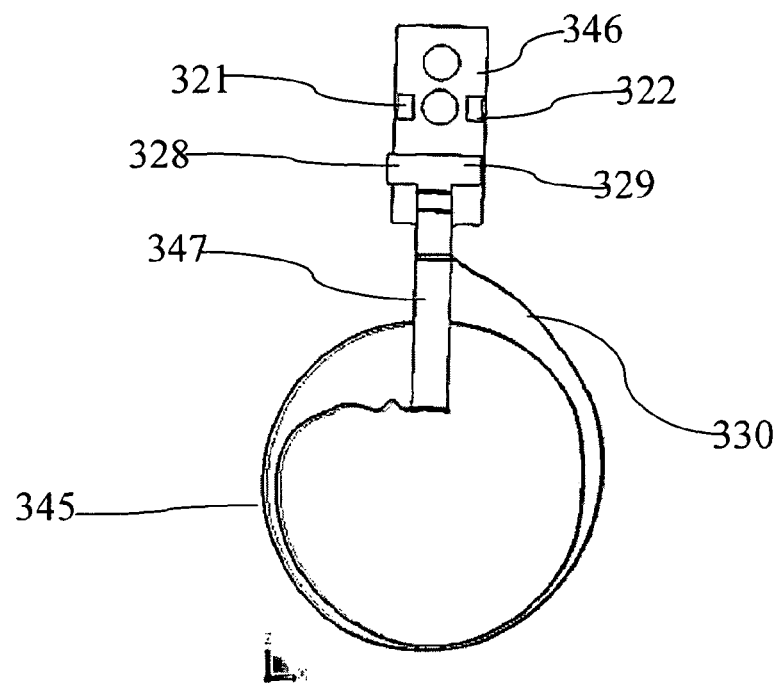
FIG. 10 shows the flexprint of the headband in a front view.
Figure 10A:
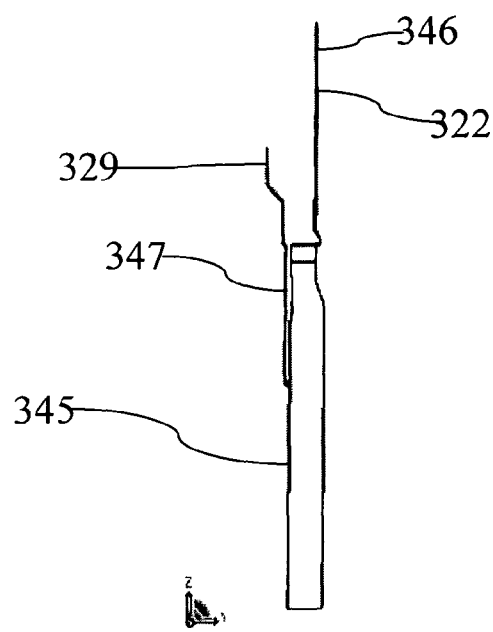
FIG. 10a shows the flexprint of FIG. 10 in a side view.

In FIGS. 10 and 10a front view and side view are shown of the electrical leads 330 inside of the headband 300. The leads 330 connect charging input points 321, 322 and charging output solder points 328,329. The leads 330 are provided in the shape of a flexprint element, wherein the electrical leads are provided as lanes on a flexible sheet material, the lanes usually being generated in electrochemical processing which is well known and will not be further described. The charging input points 321,322 are metal covered areas of the flexprint sheet material which are connectable from the outside through a suitable window in the cradle neck portion 320 of the headband 300. Each of the charging output points 311, 312 constitute a multipart springloaded electrical connection element, and are soldered to each their charging output point 328, 329 respectively. From FIGS. 10 and 10a it can be seen that the flexprint comprise a coiled portion 345 and a cradle neck extension 346 from a first end of the coiled portion and a cradle extension 347 from a second end of the coiled portion. As the flexible print board 330 is soft and bendable it is possible to rotate the cradle extension 347 with respect to the cradle neck extension 346 while the coiled portion 345 absorbs the deformation. This rotation is naturally within certain limits, but from the shown position where the cradle and cradle neck portions are aligned with each other, the cradle is to be rotated 140 deg to either side with respect to the cradle neck. This allows the microphone boom in the headset to be pointed to the user's mouth with the headset at the right ear as well as at the left ear of the user. And this can be done without disconnection of the headband and headset from each other, and any user may then without further ado take the headset to his or her preferred ear and adjust the microphone boom arm to the right position with respect to the mouth.

Figure 9:
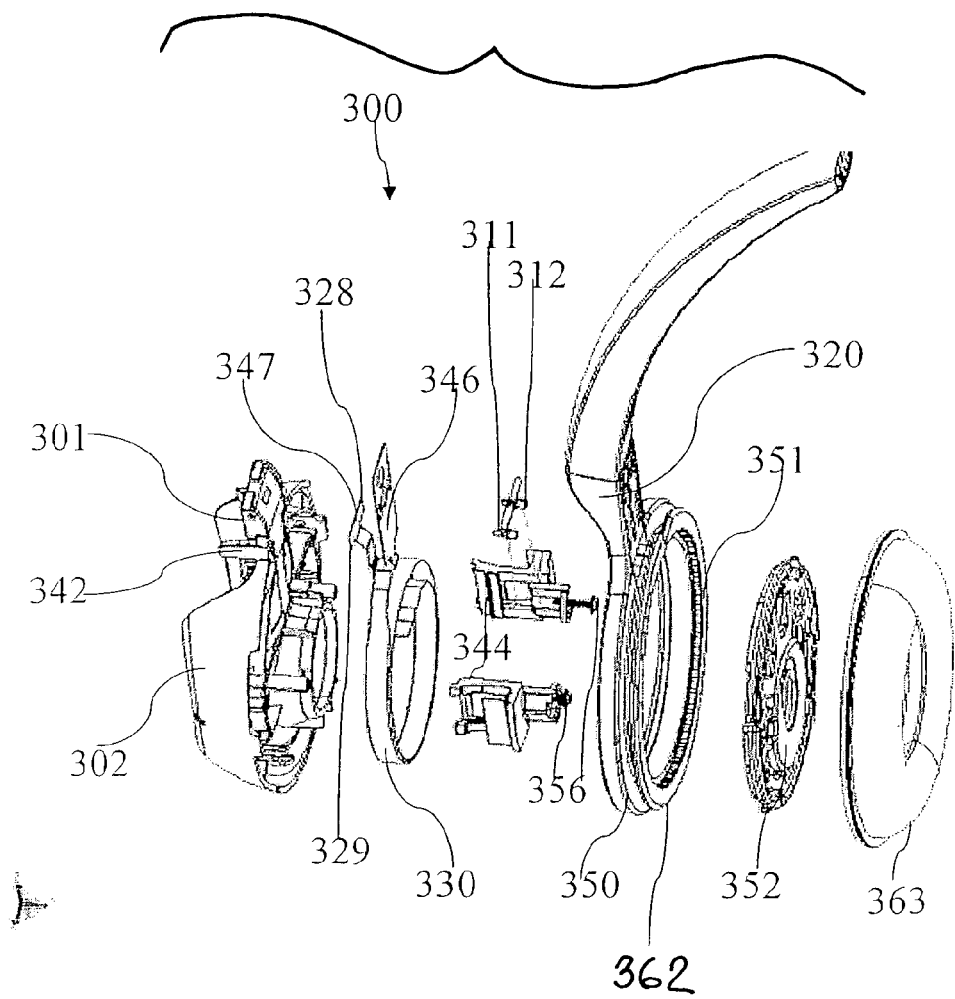
FIG. 9 shows an exploded view of the main parts of the headband.

In FIG. 9 it can be seen how the cradle-neck portion 320 is integrally molded with a ring-shaped element 350 which features an internal cammed surface 351. The cradle portion 301 is integrally shaped with a shell part 302 and the shell part is connected to a circular disc-shaped cam follower element 352 by a suitable connection means such as by use of screws 356. The screws 356 keep together the shell part 302 and the cam follower disc 352 and keep in place the holding elements 344, while the flexprint element 330 will be enclosed in between the shell 320 and the cam follower disc 352. The cam follower disc 352 and the shell 302 are assembled from each their side of the ring-shaped element 350, and form a subassembly, which is rotatable with respect to the ring-shaped element 350.

Figure 11:
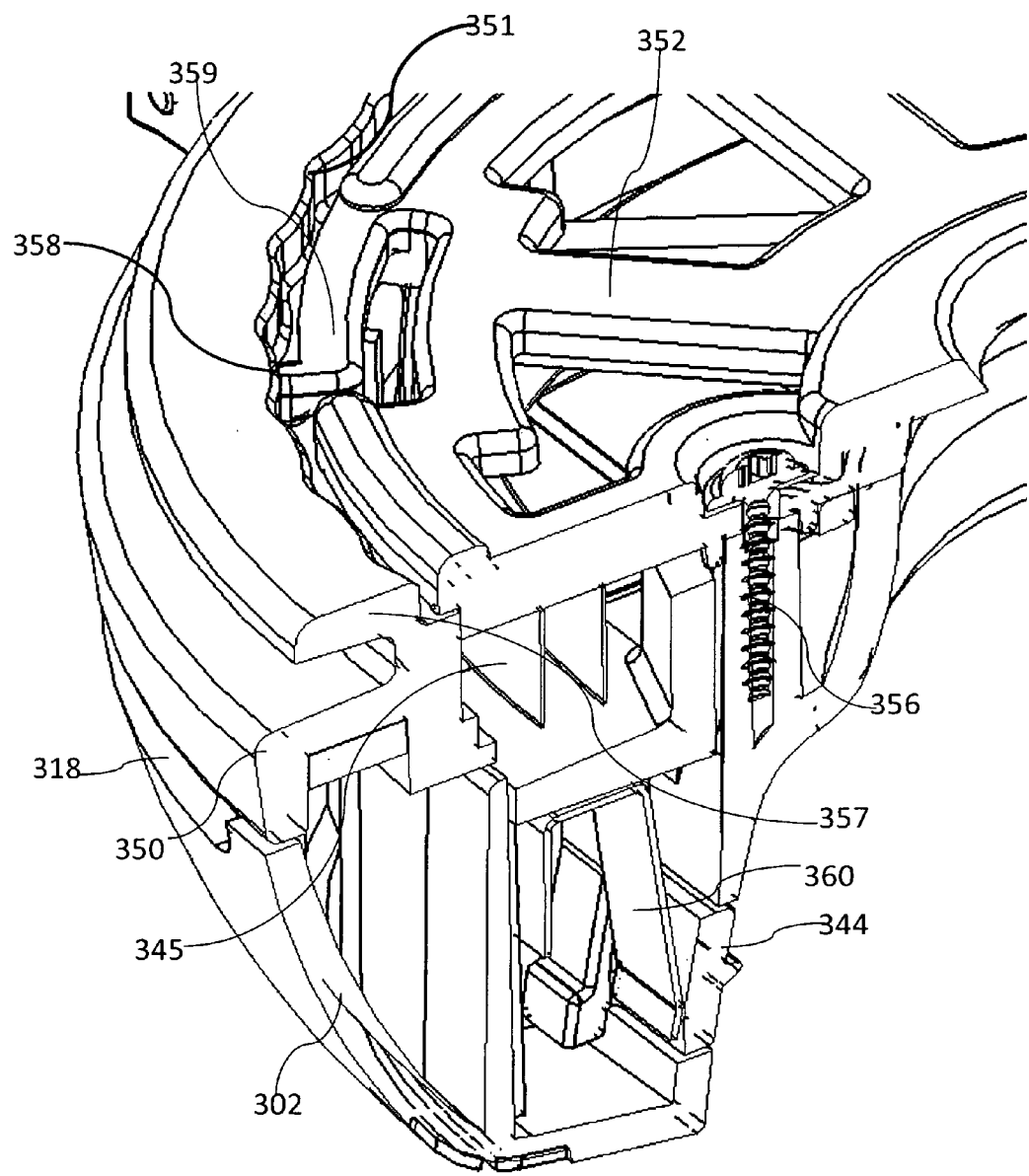
FIG. 11 shows the headband in a 3d projection and sectioned.

In FIG. 11 a sectional view of a 3D projection of the headband is shown, to better illustrate the above elements. The ringshaped element 350 with the cammed surface 351 is seen, and further opposed flanges 357 between the ringshaped element 350 and the cam follower disc 352 are disclosed, which serve as bearing in both radial and axial direction between the cam follower disk 352 and the ringshaped element 351. It is clear from the figure also that the cam follower disk is not massive but is shaped more like a wheel with spokes. This openness of the disk is acoustically important as it facilitates a more open fit, whereby the user of the headband with the headset seated therein also will receive a certain amount of sounds from the surrounding at this ear. Openings 318 in the shell part 302 of the headband ensure that sound from surroundings may reach the ear and this enhances the comfort for the user. Spring elements 360 are provided to ensure the springiness of the holding element 344.

Figure 17:
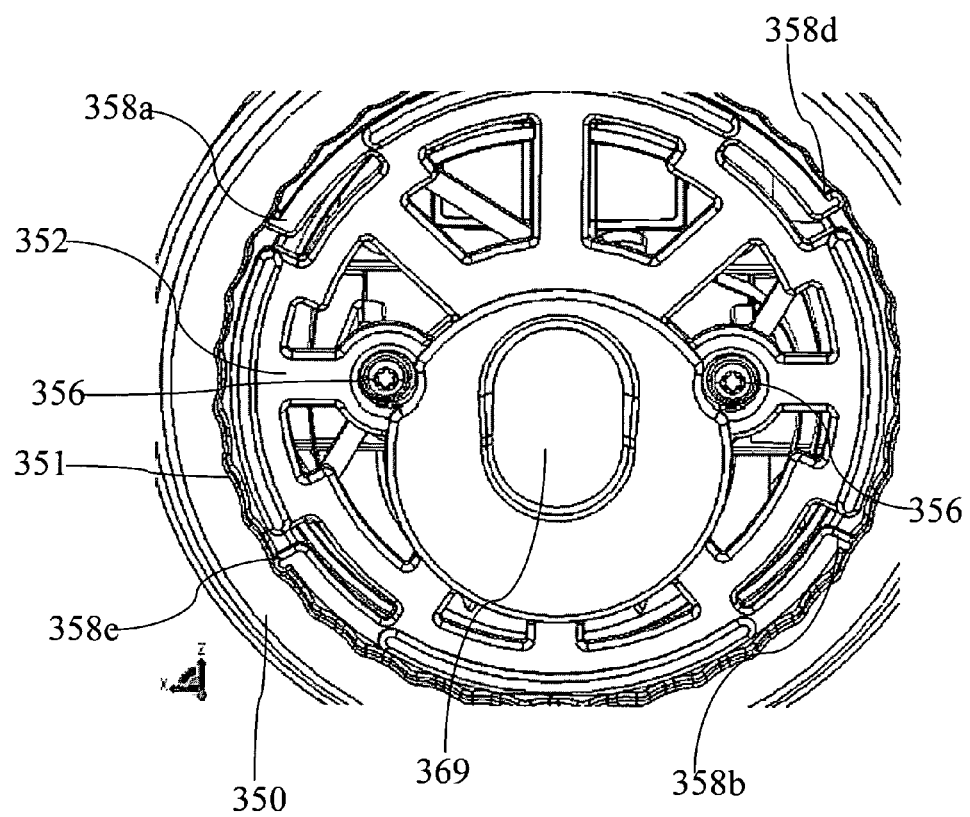
FIG. 17 shows an enlarged plan view of the cam follower disc and cammed surface.

Cam followers 358 are shaped integrally with cam follower disk 352, and are provided to flex towards the cam surface 351 in order to securely position the microphone boom arm at well defined positions. The cam followers 358 are arranged around the circumference of the disk 352 and each cam follower is provided at a flexible spring element 359 to ensure that the cam followers 358 remain in forceful contact with cam surface 351. An enlarged plane view of the cam follower disc 352 and cammed surface 351 is provided in FIG. 17. The cam followers 358, of which there are four labeled 358a, 358b, 358c and 358d in FIG. 17 are evenly spaced around the circumference. As seen in FIG. 17 they are provided such that two cam followers 358a, 358b opposite each other will both be at the top of a cam, while the two further cams followers 358c, 358d will be at the bottom between two cam projections. In this way two cam followers will be on their way "uphill" while the two others will be on their way "downhill" on the cammed surface. This ensures a rather smooth operation when the headset boom arm is turned with respect to the brace across the head.

Also in FIG. 11 the flexprint coiled portion 345 is seen positioned at the inner side of the ring-shaped element 350 and enclosed between the cam follower disk 352 and the shell 302. At both sides of the coiled portion in the radial direction space is provided such that the coil 345 may move inwardly and outwardly in the radial direction when the cradle-neck and cradle portions of the headband are moved with respect to each other. An outwardly directed flange 362 is provided at the ring-shaped element 350, and on this flange 362 the ear muff 363 may be attached.

Centrally in the cam follower disk an oblong opening 369 is provided and through this opening the sound from the loudspeaker 226 in the headset 200 will be guided towards the ear of the user.

Figure 12:
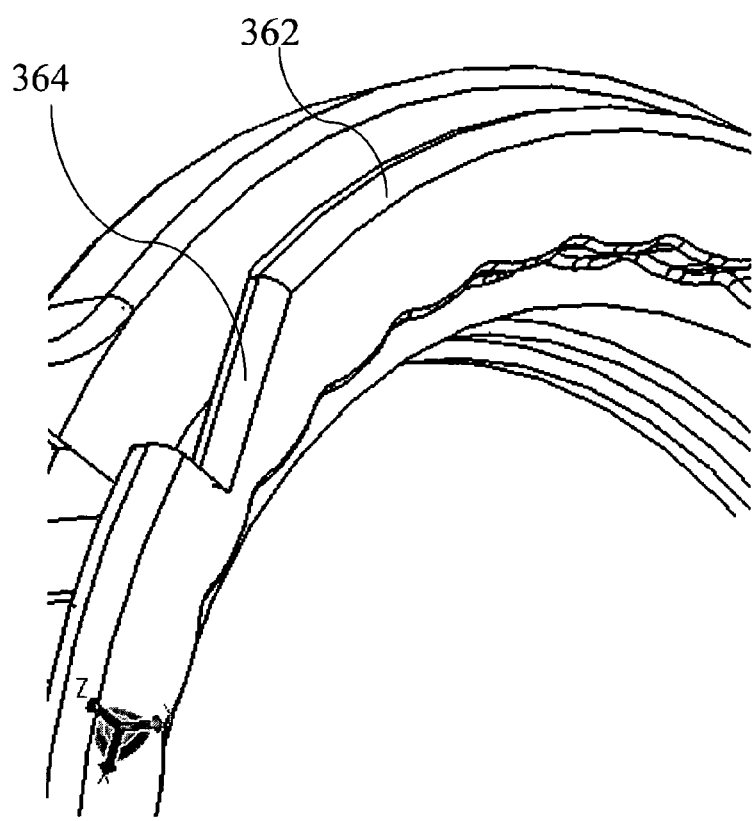
FIG. 12 shows a detail of the headband in enlarged 3d projectional view.
Figure 13:
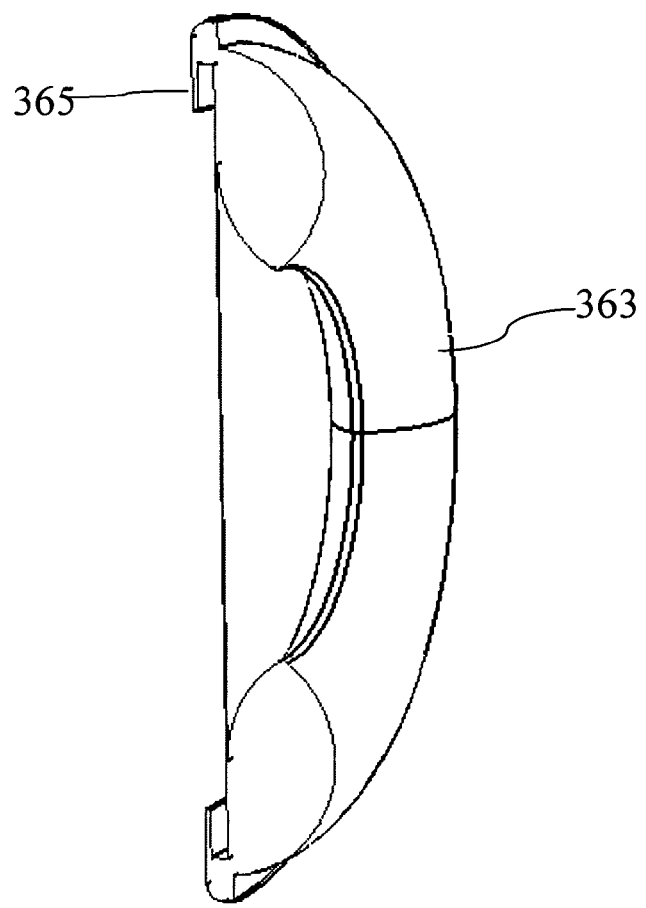
FIG. 13 shows a sectional view of the ear muff of the headband.
Figure 13:

As seen in FIG. 12, the flange 362 has a triangular cut out portion 364 which facilitates mounting of the earmuff 363 on the flange 362, as the cut out portion allows the ear muff 363 to be mounted in simple rational motion between the flange 362 and the ear muff 363. The earmuff 363 is shown in 3D projection in a sectional view, and here an inwardly flanged portion 365 can be seen, and this portion fits over the flange 362 in the described manner. This allows easy exchange of the earmuff 363, and this allows the user to choose the earmuff material and texture according to his or her liking.

Figure 4A:
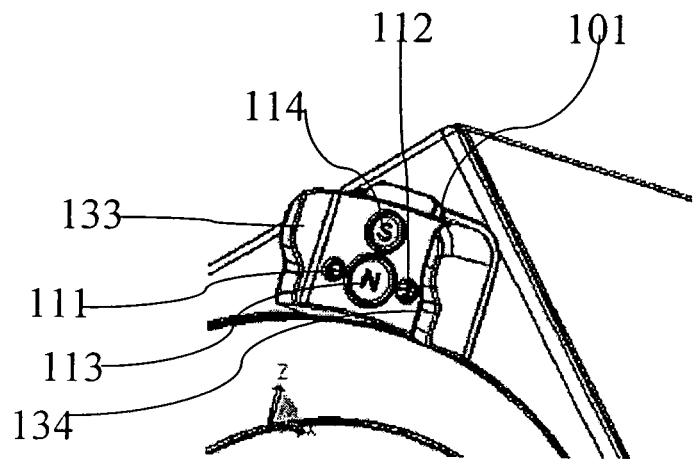
FIG. 4a shows an enlarged view of a detail of the cradle in the base station shown in FIG. 4.
Figure 4B:
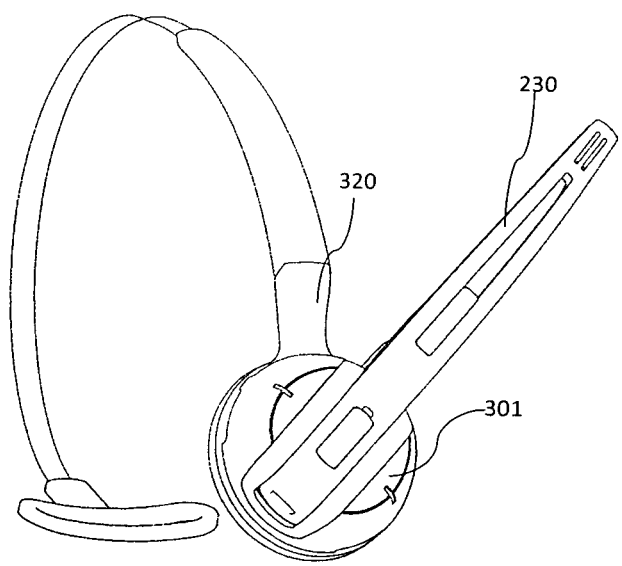
FIG. 4b shows the headset and headband combination with the headset turned away from the vertical position.

As best seen in FIG. 4a, the base station 100 has in a surface region at the cradle thereof 101 a first surface mounted magnetic means 113 displaying a first magnetic polarization and a second surface mounted magnetic means 114 adjacent thereto and displaying a second magnetic polarization which is opposite the first magnetic polarization. In FIG. 4a the first magnetic means 113 is slightly larger than the second magnetic means 114. The magnetic means 113,114 are simple round magnets being mounted in surface orifices to have an exterior surface flush with the surrounding surface region of the cradle portion to which they are attached.

The headset 200 has at a corresponding surface region at the cradling neck 201 at least a further surface mounted magnetic means 215 displaying only one of the first or the second polarization. In this way it is ensured that this further magnet is respectively attracted to and repulsed from the two magnetic means 113, 114 of the bases station cradle. As the magnets are arranged in the displayed embodiment the headset magnet 215 is arranged to be attracted to the first magnet 113 of the base station cradle 101, and repulsed from the second magnet 114 thereof. In this way the three magnets together aid to get the headset cradle neck 201 rightly positioned within the base station cradle 101. This positioning is critical as small deviations from the right position will result in the charging points not gaining contact with each other. The larger first magnet 113 at the base station cradle 101 ensures a good holding force between the headset and the base station. Also, the charging connection points 111,112 at the base station 100 are spring biased towards the headset input charging points 211,212 and the magnetic attraction between the headset magnet 215 and the first magnet 113 of the base station cradle aids to ensure a spring biasing force of a minimum size between input and output charging points.

At the cradle neck portion 320 of the headband 300 first and second surface mounted magnetic means 313,314 are provided. The magnetic means 313,314 displays polarization to cause attractions forces there between and the first and second surface mounted magnetic means 113,114 of the base station 100 when the headband cradle-neck portion 320 is cradled in the base station cradle 101. In this way it is ensured that both magnets of the base station attract each its magnet in the headband when the headband is cradled in the base station. A double attraction force results, and this facilitate the fixation of the headband-headset assembly in the cradle 101 of the base station 100 and a forceful fixation is required especially as the boom arm 239 and headset 200, in the cradle portion 301 of the headband 300 may be rotated with respect to the cradle neck portion 320 of the headband 300 and cause off axis weight load on the cradle/cradle neck connection between base station 100 and headband 300. Also the headband-headset assembly is considerably heavier than the headset 200 alone and further magnetic attraction aids to carry this weight in the cradle 101 of the base station 100.

The skilled artisan would readily know that the two separate magnets may be substituted by a single u shaped magnet embedded in the surface or by electromagnetic means. Possibly the magnetic means may be totally embedded such that they are invisible to the naked eye. Also magnets, which are more or less protruding from the surrounding surface or which are withdrawn to a subsurface level could be used.

The headset 200 has a loudspeaker 226 which is seated in an electronics and housing part 230 at a proximal end thereof and a boomarm 239 with a microphone 241 at a distal end 240 thereof, whereby the cradle-neck portion 201 is provided at the boomarm 239 adjacently to the electronics and housing part 230. The boomarm 239 should preferably be a lightweight construction, which extends the microphone into proximity of the users mouth as far as possible, however without causing off-axis weight load on the headset when worn on the ear without the headband. Battery charging points at the distal end of the boomarm or at the proximal end of the housing part as have previously been proposed are not desirable, as it makes a balanced cradling in a base station difficult. A cradle-neck portion should be close to the center of gravity of the unit to ensure cradling and secure holding and connection to a base station.

The base station cradle 101 comprises guiding surfaces 133, 134 (best seen in FIGS. 4, and 4a) which corresponds to opposed guiding surfaces 233,244,333,334 of the boomarm 239 (seen in FIGS. 5 and 6) and of the headband 300 (seen in FIGS. 7 and 8) at cradle neck portions thereof. In the presented embodiment, the guiding surfaces 133,134 of the base station cradle are arranged opposed to each other and embrace parts of the headset or headband, whichever is seated in the cradle. Many other ways of providing mechanical interacting surfaces to fixate the headset or the headband in the base station are possible such as a simple outstanding hook on the base station and corresponding orifices on the headset and headband respectively.

Figure 5:
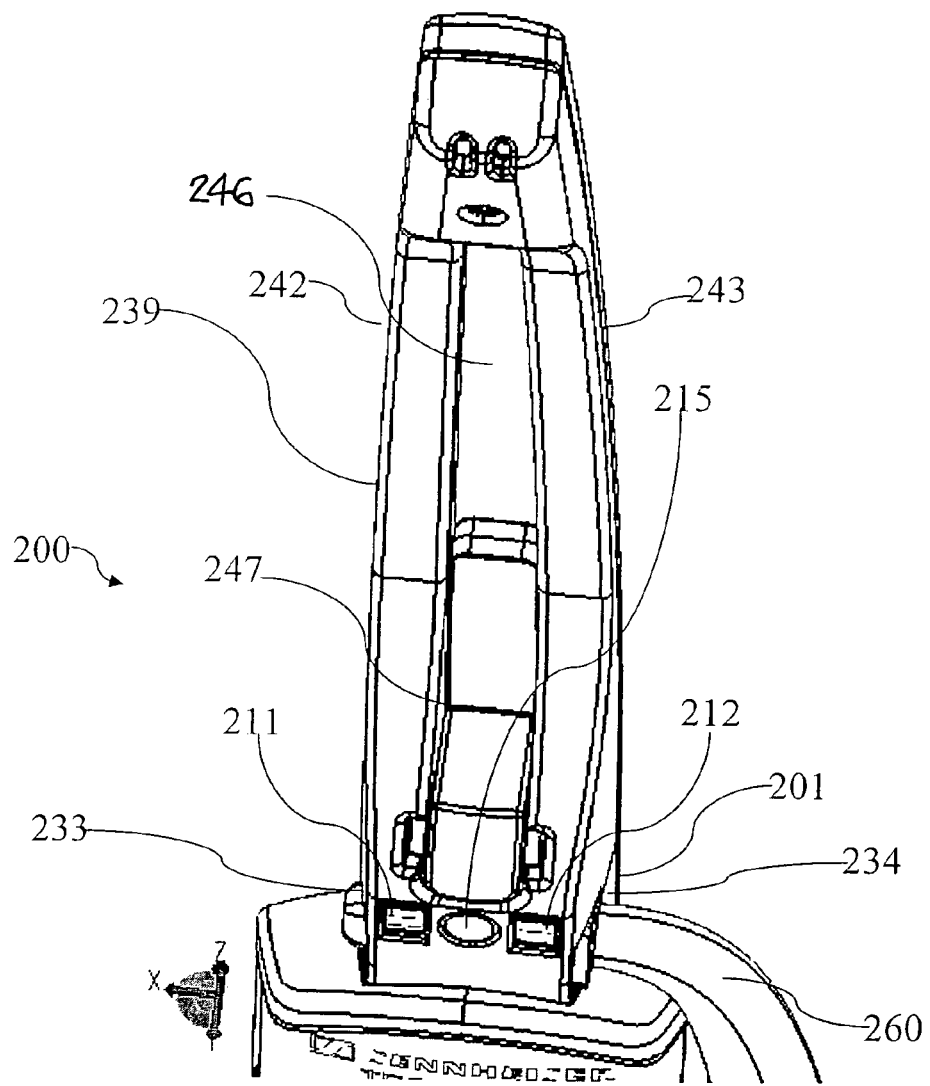
FIG. 5 shows the boom portion of the headset in a 3d projection.
Figure 6:
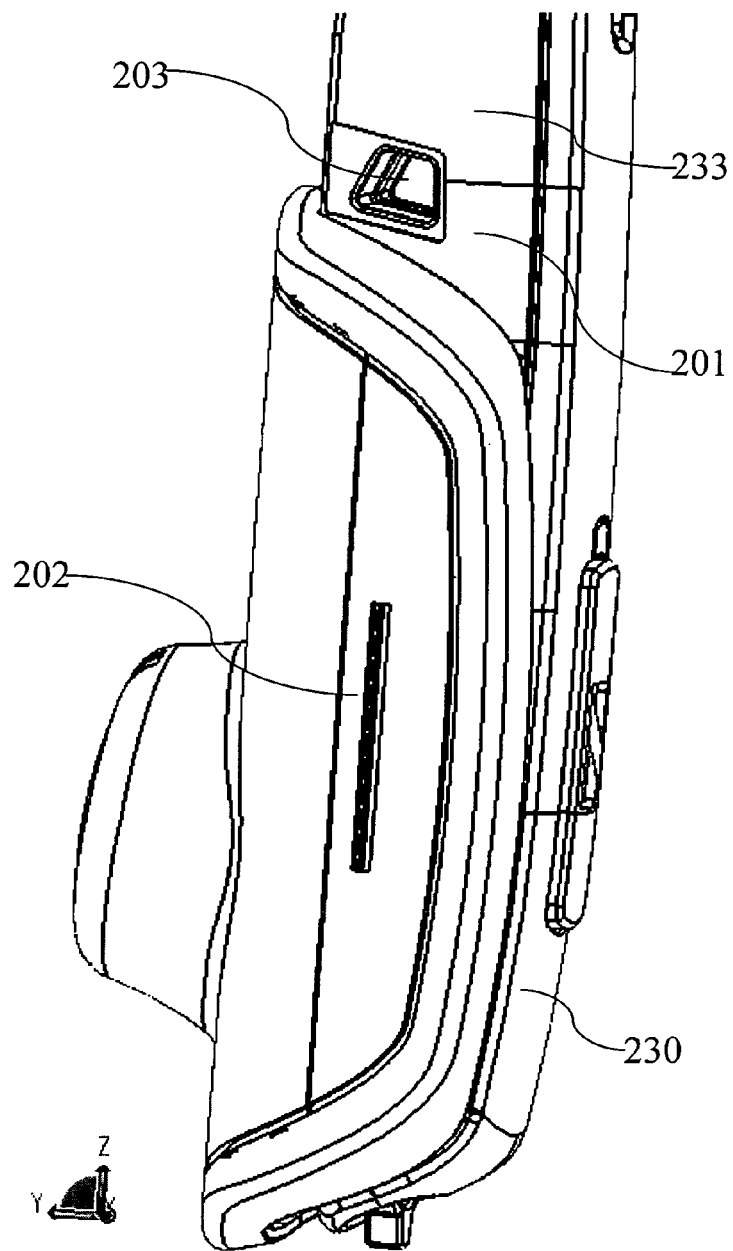
FIG. 6 shows a side view of the headset electronic casing part.
Figure 8:
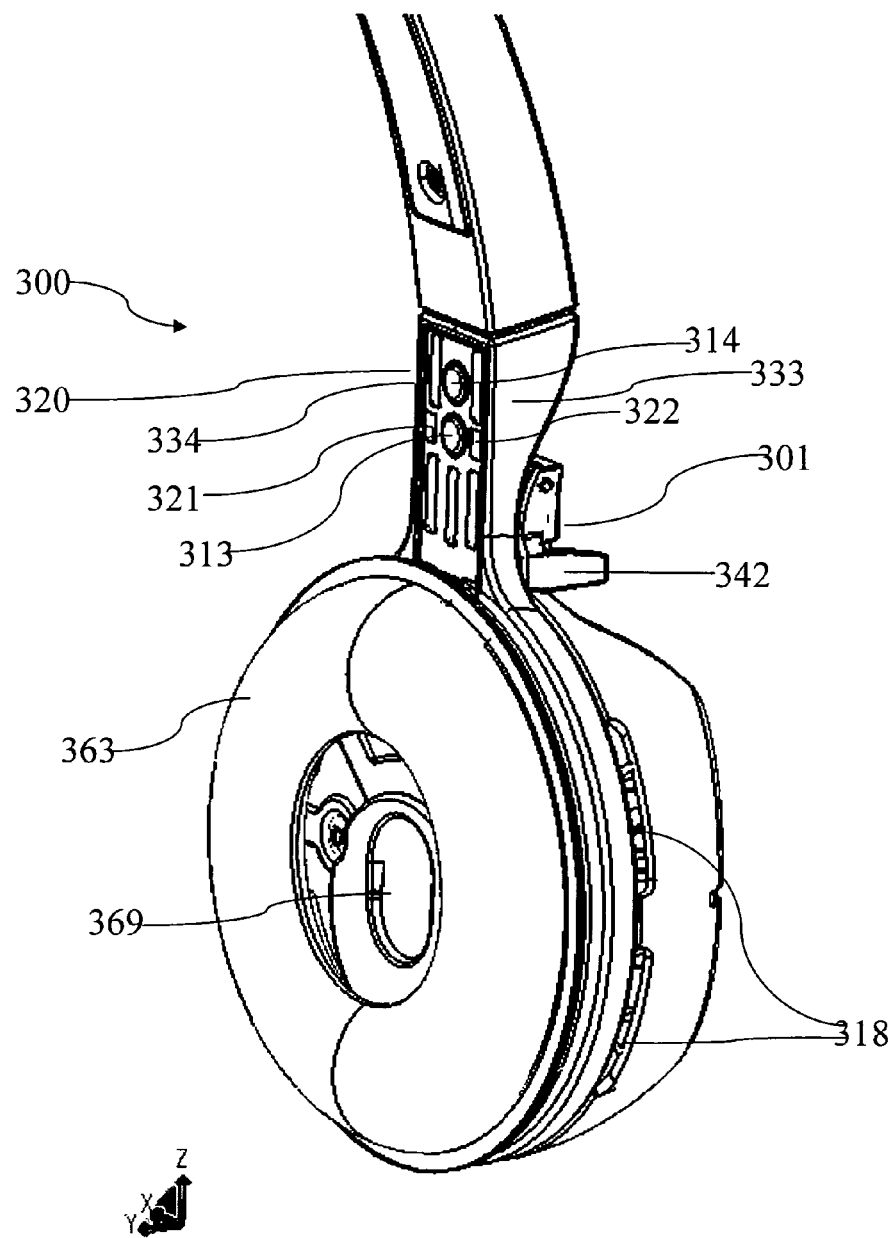
FIG. 8 shows the element in FIG. 7 from a different angle.

The various magnetic means 313, 314, 215, 113, 114 and the charging input and output connection pints 111, 112, 211, 212, 321, 322 of the base station, of the headset and of the head band cradle neck portions are provided at the guiding surfaces 333, 334, 233, 324, 133, 134 and two electrical charging connection are placed respectively, one at each side of a corresponding magnetic means. In FIGS. 4a, 5 and 8, the magnetic means 313, 314, 215, 113, 114 and the charging connection points 111, 112, 211, 212, 321, 322 are shown, and at each instance, the magnets are placed centered between the guiding surfaces, and at each side of the magnet in the space between the guiding surface and the magnet a charging connection point is provided. The guiding surfaces of the base station 100 will interact with opposed surfaces of the headset 200 or headband 300 respectively and ensure sideway fixation of the headset or headband in the base station whereas the magnets will aid to ensure that a connection force between the mating electrical connection points is maintained. Thus a distance relation exist between the guiding surfaces of the base station and the guiding surfaces of the headset and headband respectively in that the distance between the guiding surfaces of the base station correspond to the width of the boom arm and the headband at the cradle neck portions thereof.

When the headset 200 is to be worn alone without the headband 300, some means of attaching the headset to the ear is needed and to this end an earhook 260 is connectable to the headset 200 through an aperture 203 provided at the cradle neck portion 201 of the headset. The earhook 260 is seen in FIG. 3, and as displayed, the headset 200 may be seated in the cradle 101 of the base station 100 with the earhook 260 mounted in the aperture 203. As seen in FIG. 1, the headband 300 and headset 200 assembly does not allow the earhook 260 to be mounted to the headset 200, and also this would be counter-productive, as the both the earhook 260 and the headband 300 serve to maintain the headset in an operational position on a users head, but in each their unique and well known manner.

At the cradle portion 301 the headband 300 further comprises movable protrusions 340, 341 sized to enter the earhook aperture 203 when the headset 200 is connected to the headband 300. The protrusions 340, 341 are provided on flexible stags 342,343 on each side of the cradle portion 301 of the headband. The stags 342, 343, are springy movable in the direction away from each other, and as a result the headset cradle neck portion may be forced into the space between the stags forcing these away from each other, and when the headset cradle neck is secured in the cradle 301 of the headband, the protrusions 340, 431 will enter the through going aperture 203 from each their side and thus help to maintain the headset 200 and headband 300 together.

Figure 7:
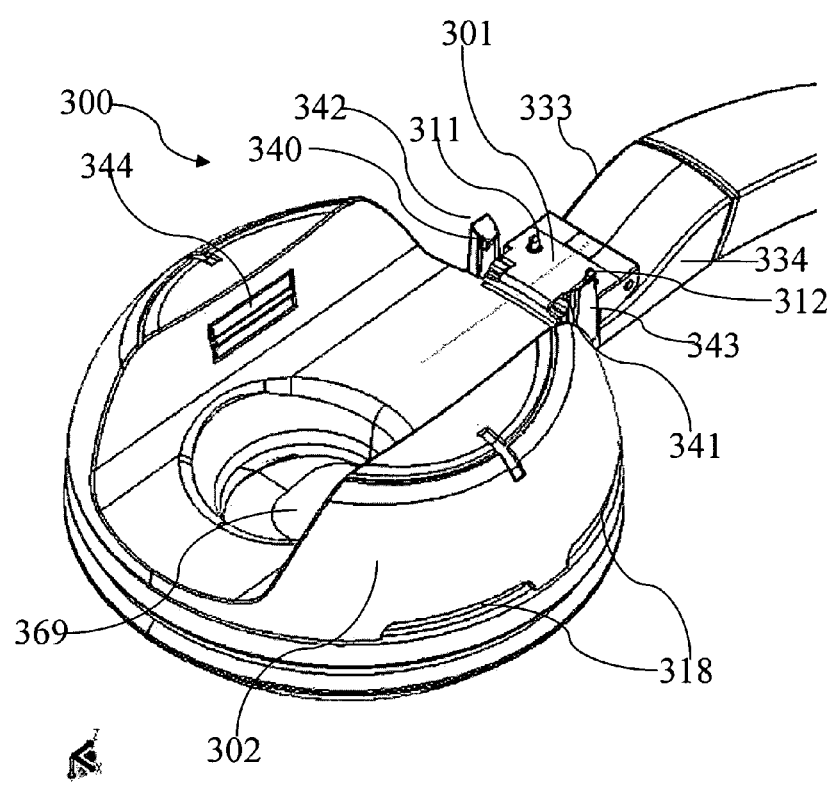
FIG. 7 shows a 3d projection of the cradle part of the headband without the headset mounted therein.

The movable protrusions 340,341 are part of the cradle portion 301 of the headband 300 as seen in FIG. 7, and they are arranged adjacently to the charging input and output points 311, 312, 211, 212 of the headband 200 and headset 300 respectively when the headset is cradled in the headband. Hereby it is ensured that the connection points for charging maintain a secure electrical connection when the headset 200 is cradled in the headband 300.

Apart from the protrusion mentioned above a further set of mating holding means are provided between headset 200 and headband 300. These comprise a click in attachment site 202 on the headset 200 and corresponding holding element 344 on the headband cradle part. The attachment cites and holding elements are repeated on opposed sides of the headband and the headset respectively. The holding elements 344 are mounted springy such that they may click into and out of the attachment cites 202 in a manner well known in the art.

Figure 14:
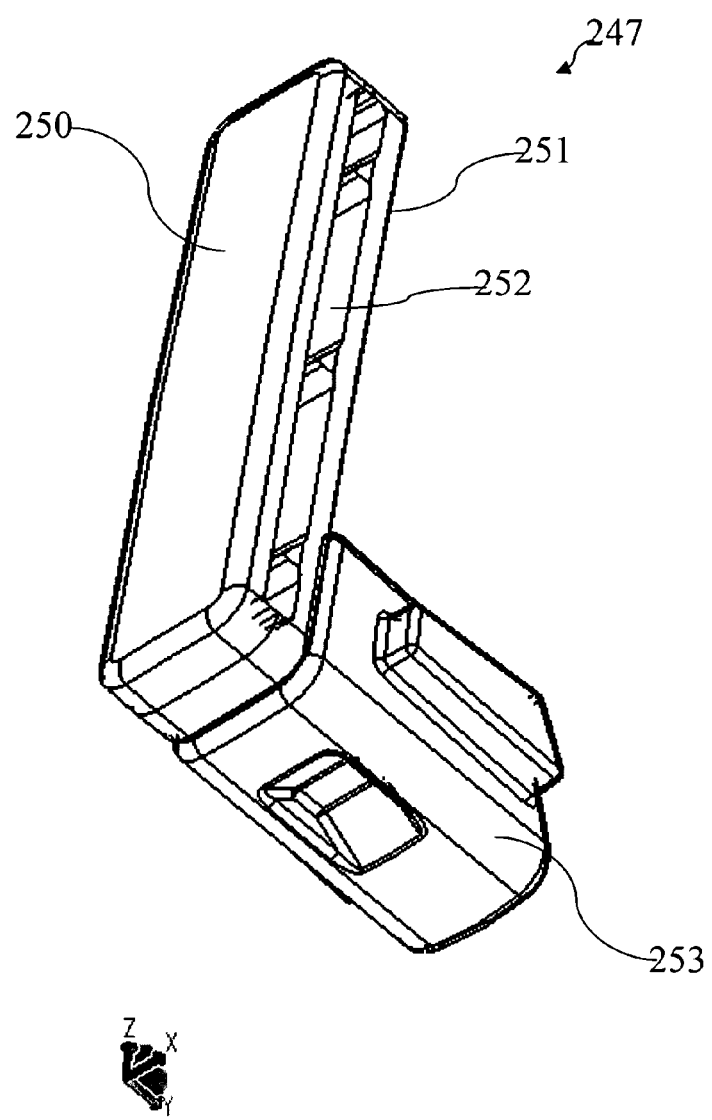
FIG. 14 shows a 3d projection of the name tag.

As seen in FIGS. 1, 3 and 5 the boom arm 239 comprise a first arm 242 and second arm 243 defining a through going oblong opening 246. As seen in FIG. 5 a name tag 247 is attached between the arms. The name tag is optional for the user but offers a possibility of personalization of the headset, and this could be an advantage in settings where numerous individuals work with each their headset in the same room. The name tag 247 is shown isolated in FIG. 14 in a 3D projectional view. The tag 247 comprises a transparent display window part 250 and name holder 251 where a slit-formed opening 252 is defined between the display window and the name holder 251. Into this slit formed opening the user may slide a piece of paper (not shown) with an identity sign printed or written thereon, such that the sign can be read through the transparent display window 250. When mounted between the arms of the headset boom 239 the display window part 250 will be flush with the exterior surface of the two arms 242, 243 and the opening 252 will be between the arms which prevent the paper with the identity sign thereon from falling out. The name tag 247 further has a holder part 253 arranged generally perpendicular to the transparent display window 250 and name holder 251. The holder part 253 comprise usual tongue and groove connection elements allowing the holder part to connect to corresponding tongue and grooves in the headset and thereby be securely seated between the arms of the headset boom proximal to the cradle neck part thereof as seen in FIG. 5.

Figure 15:
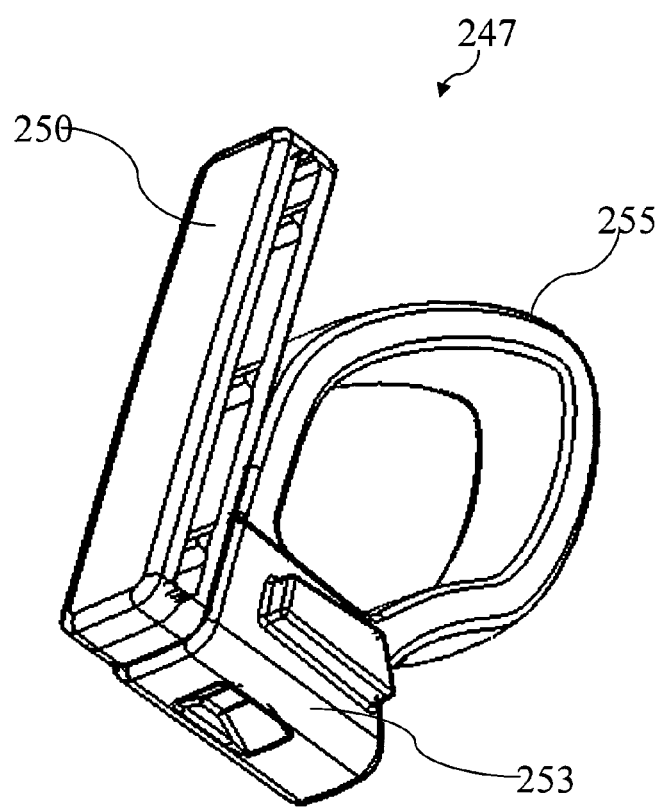
FIG. 15 shows the name tag with a cheek spacer.

In FIG. 15 the nametag 247 is shown with a cheek-spacer 255, comprising a loop-shaped addition provided in the angle spanned between the window part 250 and the holder part 253. The cheek-spacer 255 will prevent the boom arm 239 from touching the cheek of the user. Some users may not need a cheek-spacer due to the proportions of their head, and thus the user may choose to either use a name tag with or one without the cheek spacer 255. The cheek spacer 255 may be made in many ways being either loop shaped as shown or having some other shape, whereby the general idea of the invention resides in the changeability between a nametag with and one without the cheek spacer 255 depending on the user's needs.

As seen in FIGS. 1, 3 and 4 the base station has a foot part 150 and an upright casing part 151 immovably connected to the foot part. The casing part 151 is shaped as a six sided cube with six square and plane surfaces labeled 1, 2, 3, 4, 5 and 6. The cube 151 appear fused to the foot part 150 at a corner constituted by the intersection of cube surfaces 1, 2 and 3, such that surface 4 of the cube will appear angled away from a vertical direction with relation to a desk top on which the foot 150 is placed. The cube surface 3 will face towards the desk top at similar angle. The cradle 101 is positioned on cube surface 4, adjacent to a top most corner, comprised of intersection of cube surfaces 4, 5 and 6, directly opposite the corner fused with the foot part 150. The headset 200 with or without the headband 300 will rest at surface 4 when the headset is cradled for recharging of the battery 225. As best seen in FIG. 4, at cube surface 4 a rounded recess 7 is provided, wherein either the headset casing part as seen in FIG. 3 or the earmuff (shown in FIG. 1) may be seated when the headset and/or the headband is cradled as described above. Centrally in the recess a toggle button 8 is provided, such that the user may toggle between PC and line input to the headset. At the surface 3 the various lines to the base station are connected to the base station in the usual manner, and this is not shown or described in any further detail. Inside the cube 151 electronics such as a wireless transmitter and control circuits for the recharging of the headset battery is provided.

Figure 16:
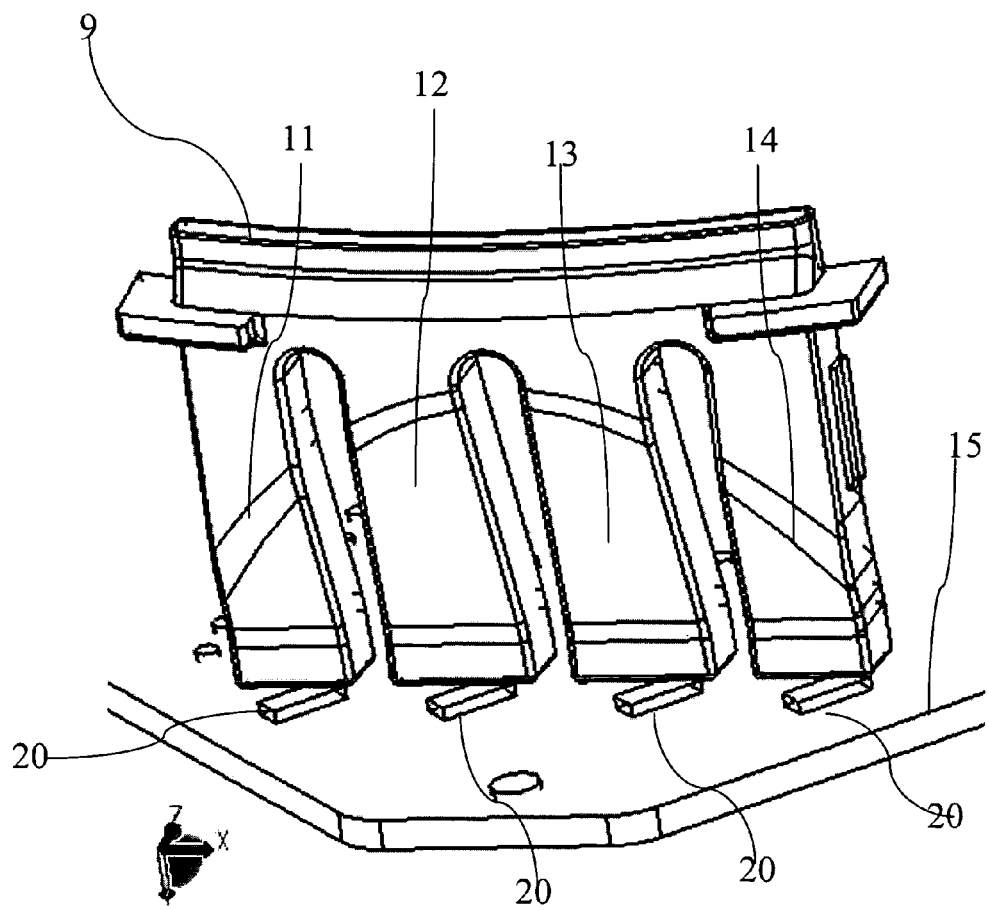
FIG. 16 shows the light display and underlying printed circuit board in 3d projection.

In order that the user may see the charging status of the battery of a headset, a transparent light display 9 is provided to this effect on the surface 4 of base station 100. A number of light diodes 20 are provided inside the cube, and illuminates the front of the display 9 through each their light guide 11, 12, 13, 14 shaped integrally with the display 9. In FIG. 16 a corner of a printed circuit 15 board is shown with the diodes 20 mounted thereon. The light from each diode 20 will travel through each its light guide 11, 12, 13, 14 and exit through the display 9. Dependent on the transparency properties of the material used for the display 9 and light guides 11-14 the light from each diode 20 will either appear in a rather sharply limited area, above the light guide, or appear in rather fuzzy manner with a strong intensity at a central point and falling intensity going away from the central point. By choosing a very transparent material for the light guides 11-14 and the display 9, a discrete display of four clearly defined areas can be achieved and each area may be lit independently of the others. On the other hand, a material which causes some dispersion of the light may be chosen, in the event that a more smooth display action is wished. On top of this the intensity of the light from the diodes 11-14 may be variable if wished. In a preferred embodiment a material is chosen which provides a fuzzy light, and the light intensity from the diodes is varied to the effect that a smooth advance of an illuminated area on the display 9 is achieved corresponding to the charging status of the rechargeable battery in the headset.

The invention is defined by the features of the independent claim(s). Preferred embodiments are defined in the dependent claims. Any reference numerals in the claims are intended to be non-limiting for their scope.

The invention claimed is:

1. A combination of a base station, a wireless headset and a headband, said wireless headset being mountable on said headband,
    said base station comprising a cradle for mounting either said wireless headset or said headband, and first and second spaced electrical charging contact points
    said wireless headset comprising a rechargeable battery, a cradle neck which is directly mountable on said cradle of said base station, and first and second electrical charging input contact points which contact said first and second electrical charging output contact points of said base station when said cradle-neck is mounted directly on said cradle, and
    said headband comprising a cradle portion, a cradle-neck which is directly mountable on said cradle of said base station, first and second electrical charging input contacts for contacting said first and second electrical contact points provided at said cradle-neck portion of said headband of said base station when said cradle-neck thereof is mounted on said cradle of said base station, third and fourth electrical charging output contact points provided at said cradle portion of said headband for contacting said first and second electrical charging input contact points of said wireless headset when said wireless headset is mounted on said headband, and electrical connections within said headband for respectively connecting said first and third and said second and fourth electrical charging contact points of said headband.

2. The combination as claimed in claim 1, wherein the headband cradle-neck portion and the headband cradle portion are mutually rotatable with respect to each other.

3. The combination as claimed in claim 2, wherein the electrical leads between the charging input points at the cradle-neck portion of the headband and the charging output points at the cradle portion of the headband allow the mutual rotational positioning between the headband cradle-neck portion and the headband cradle portion without disturbance to the electrical connection.

4. The combination as claimed in claim 3, wherein the base station in a surface region at the cradle comprise a first surface mounted magnetic means displaying a first magnetic polarization and a second surface mounted magnetic means adjacent thereto and displaying a second magnetic polarization which is opposite the first magnetic polarization and wherein also the headset at a corresponding surface region at the cradle-neck comprise at least a further surface mounted magnetic means displaying only one of the first or the second polarization ensuring attraction forces and repulsion forces respectively between this further magnetic means and the two magnetic means at the bases station cradle.

5. The combination as claimed in claim 3, wherein first and second surface mounted magnetic means are provided at the cradle-neck portion of the headband displaying polarization to cause attraction forces therebetween and the first and second surface mounted magnetic means of the base station when the headband cradle-neck portion is cradled in the base station cradle.

6. The combination as claimed in claim 4, wherein the headset has a loudspeaker provided in an electronics housing part at a proximal end thereof and a boomarm with a microphone at a distal end thereof, whereby the cradle-neck portion is provided at the boomarm adjacently to the electronics and housing part.

7. The combination as claimed in claim 6, wherein the base station cradle comprises guiding surfaces which corresponds to opposed guiding surfaces of the boomarm and of the headband at cradle-neck portions thereof.

8. The combination as claimed in claim 7, wherein the magnetic means and the charging input or output connection points of the base station, of the headset and of the head band cradle-neck portions are provided between the guiding surfaces and wherein two electrical charging connections are placed respectively, one at each side of a corresponding magnetic means.

9. The combination as claimed in claim 8, wherein the guiding surfaces of the base station comprises two opposed protruding wall parts with a distance therebetween corresponding to the width of the boom arm and the headband at the cradle-neck portions thereof and where magnetic means and electrical charging connection points are located between the two opposed protruding wall parts.

10. The combination as claimed in claim 1, wherein an earhook is connectable to the headset through an earhook aperture provided at the cradle-neck portion.

11. The combination as claimed in claim 10, wherein the headband at its cradle portion further comprises movable protrusions sized to enter the earhook aperture.

12. The combination as claimed in claim 11, wherein the movable protrusions are part of the cradle portion of the headband and arranged adjacently to the charging input and output connection points of the headband and headset respectively.

* * * * *